(12) United States Patent
King et al.

(10) Patent No.: US 8,990,554 B2
(45) Date of Patent: *Mar. 24, 2015

(54) NETWORK OPTIMIZATION FOR SECURE CONNECTION ESTABLISHMENT OR SECURE MESSAGING

(75) Inventors: William C. King, Lafayette, CA (US); Kwai Yeung Lee, Pittsburg, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/584,226

(22) Filed: Aug. 13, 2012

(65) Prior Publication Data

US 2013/0232335 A1 Sep. 5, 2013

Related U.S. Application Data

(63) Continuation-in-part of application No. 13/412,141, filed on Mar. 5, 2012, which is a continuation-in-part of application No. 13/174,644, filed on Jun. 30, 2011, application No. 13/584,226, which is a continuation-in-part of application No. 13/469,227, filed on May 11, 2012.

(51) Int. Cl.
*H04L 9/00* (2006.01)

(52) U.S. Cl.
USPC ............................ 713/155; 713/168; 713/169

(58) Field of Classification Search
CPC ... H04L 9/08; H04L 63/0428; H04L 63/0823; H04L 63/08; H04L 63/0869; H04W 12/06; H04W 12/02

USPC ................ 713/150, 152, 155, 161, 168–171; 726/1–4; 380/247, 255, 270

See application file for complete search history.

(56) References Cited

U.S. PATENT DOCUMENTS

| | | | |
|---|---|---|---|
| 5,986,568 A | 11/1999 | Suzuki et al. | |
| 7,136,651 B2 * | 11/2006 | Kalavade | 455/445 |
| 7,386,878 B2 | 6/2008 | Fernando et al. | |
| 7,954,141 B2 * | 5/2011 | De Lutiis et al. | 726/9 |
| 8,230,035 B2 * | 7/2012 | Morgan et al. | 709/213 |

(Continued)

OTHER PUBLICATIONS

3GPP Organizational Partners, "3GPP TS 33.110, $3^{rd}$ Generation Partnership Project; Technical Specification Group Services and System Aspects; Key Establishment between a Universal Integrated Circuit Card (UICC) and a terminal (Release 9)", V9.0.0, Dec. 2009, 28 pages.

(Continued)

*Primary Examiner* — Hosuk Song

(57) ABSTRACT

A first device is configured to receive an instruction to establish a secure connection with a second device or to send a secure message to the second device. The instruction may include a secure connection invitation or a message. The first device may send information, associated with the second device, to a first server; receive a response from the first server; obtain parameters based on the response indicating that the second device is subscribed to the first server; communicate the parameters to the first server; receive a parameters identifier associated with the parameters; store the parameters identifier in the secure connection invitation or the message; and send the secure connection invitation or the message to the second device. The second device may receive the parameters identifier to obtain the parameters to establish the secure connection or to decrypt the secure message.

21 Claims, 11 Drawing Sheets

(56) References Cited

U.S. PATENT DOCUMENTS

| | | |
|---|---|---|
| 8,353,011 B2 | 1/2013 | Bajko et al. |
| 2003/0177401 A1 | 9/2003 | Arnold et al. |
| 2004/0145773 A1 | 7/2004 | Oakeson et al. |
| 2008/0065891 A1 | 3/2008 | Karamchedu et al. |
| 2008/0133761 A1 | 6/2008 | Polk |
| 2008/0307511 A1 | 12/2008 | Ahtisaari |
| 2009/0063851 A1 | 3/2009 | Nijdam |
| 2009/0067628 A1 | 3/2009 | Pudney et al. |
| 2009/0089583 A1 | 4/2009 | Patel |
| 2009/0094457 A1 | 4/2009 | Lapstun et al. |
| 2009/0158034 A1 | 6/2009 | Gu et al. |
| 2009/0180614 A1 | 7/2009 | Rajagopal et al. |
| 2010/0030904 A1 | 2/2010 | Oda et al. |
| 2010/0054472 A1 | 3/2010 | Barany et al. |
| 2010/0153726 A1 | 6/2010 | Liu et al. |
| 2010/0268937 A1 | 10/2010 | Blom et al. |
| 2010/0273455 A1 | 10/2010 | Tamura et al. |
| 2011/0055565 A1 | 3/2011 | Murakami et al. |
| 2011/0091036 A1 | 4/2011 | Norrman et al. |
| 2011/0167272 A1 | 7/2011 | Kolesnikov |
| 2011/0185070 A1 | 7/2011 | Xue et al. |
| 2011/0206206 A1 | 8/2011 | Blom et al. |
| 2012/0027211 A1 | 2/2012 | Lehtovirta et al. |
| 2012/0109830 A1 | 5/2012 | Vogel |
| 2012/0204027 A1 | 8/2012 | Baek et al. |
| 2012/0311329 A1 | 12/2012 | Medina et al. |
| 2012/0322416 A1 | 12/2012 | Sundaram et al. |
| 2013/0024686 A1 | 1/2013 | Drucker |
| 2013/0060708 A1 | 3/2013 | Oskolkov et al. |
| 2013/0085880 A1 | 4/2013 | Roth et al. |
| 2013/0091556 A1 | 4/2013 | Horn et al. |
| 2013/0315389 A1 | 11/2013 | Jung et al. |

OTHER PUBLICATIONS

3GPP Organizational Partners, "3GPP TS 33.220, $3^{rd}$ Generation Partnership Project; Technical Specification Group Services and System Aspects; Generic Authentication Architecture (GAA); Generic bootstrapping architecture (Release 9)", VP.9.0, Jun. 2010, 75 pages.

3GPP Organizational Partners, "3GPP TS 33.401, $3^{rd}$ Generation Partnership Project; Technical Specification Group Services and System Aspects; 3GPP System Architecture Evolution (SAE); Security architecture (Release 9)", V9.6.0, Dec. 2010, 105 pages.

\* cited by examiner

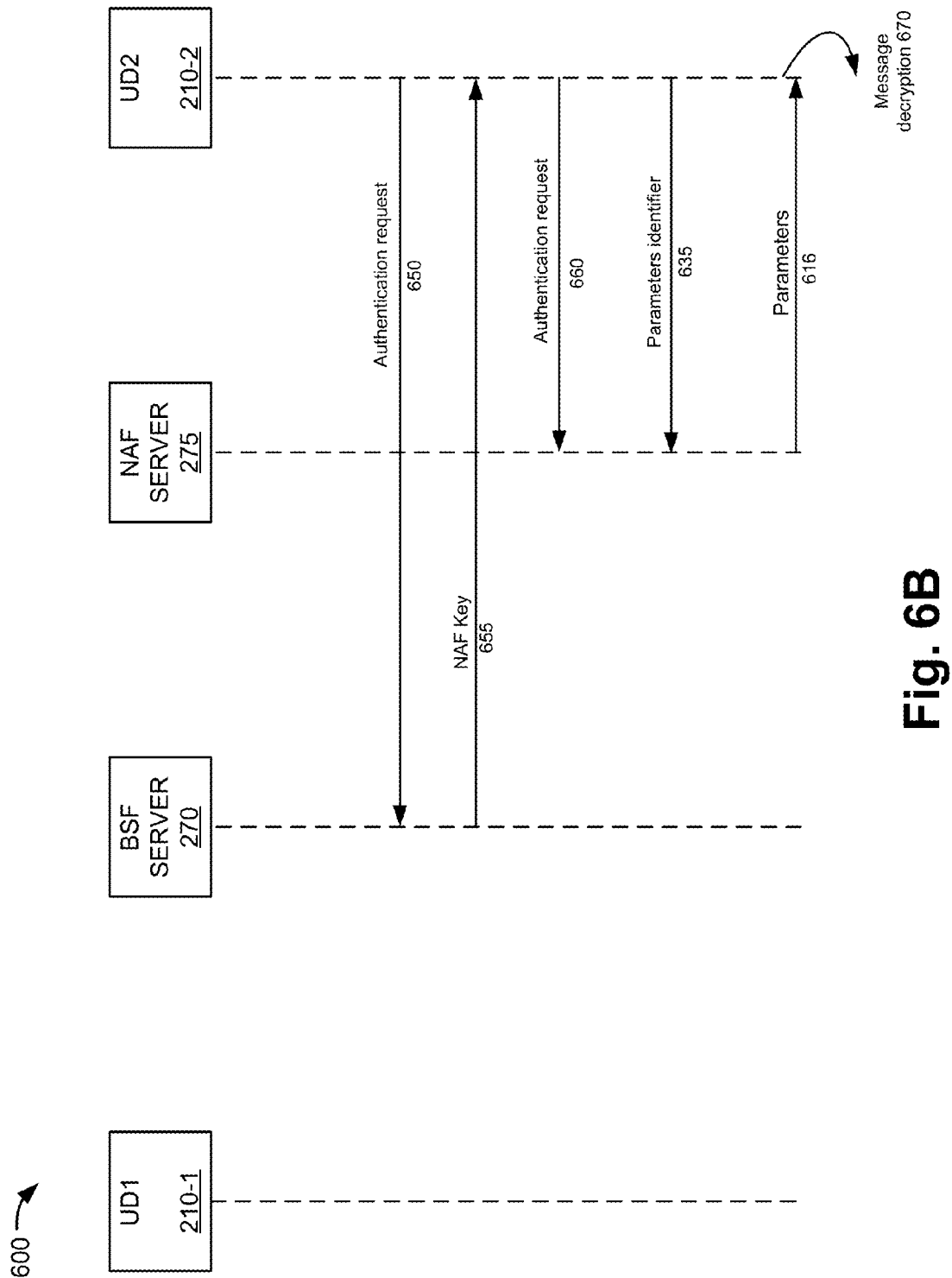

NETWORK OPTIMIZATION FOR SECURE CONNECTION ESTABLISHMENT OR SECURE MESSAGING

RELATED APPLICATIONS

This application is a continuation-in-part of U.S. patent application Ser. No. 13/412,141, filed on Mar. 5, 2012, which is a continuation-in-part of U.S. patent application Ser. No. 13/174,644, filed on Jun. 30, 2011. This application is also a continuation-in-part of U.S. patent application Ser. No. 13/469,227, filed on May 11, 2012. The entire content of U.S. patent application Ser. Nos. 13/412,141, 13/174,644, and 13/469,227 is incorporated herein by reference.

BACKGROUND

Users sometimes use user devices to place voice calls, place video calls or to send messages to other user devices. Voice calls, video calls and messages may be communicated via a network, such as a cellular network or the World Wide Web ("web"). Network connections between user devices may expose the user devices to security risks, thereby exposing potentially sensitive and private information associated with the user devices.

BRIEF DESCRIPTION OF THE DRAWINGS

FIGS. 6A-6B illustrate a call flow diagram of example operations capable of being performed by an example portion of the environment of FIG. 2.

DETAILED DESCRIPTION OF THE PREFERRED EMBODIMENTS

The following detailed description refers to the accompanying drawings. The same reference numbers in different drawings may identify the same or similar elements.

A system and/or method, as described herein, may ensure the secure exchange of security parameters (referred to as "parameters") between user devices. In some implementations, the parameters may be used to generate a security key in order to establish a secure connection between two user devices (e.g., to allow the user devices to communicate with one another to perform a task, such as placing a voice call or placing video call between the user devices), encrypt a message (e.g., an electronic mail (e-mail) message, a secure message service (SMS) text message, or some other type of message), and/or decrypt a message. For example, the system and/or method may allow a sending user device (referred to as "UD1") to exchange parameters with a receiving user device (referred to as "UD2"), via one or more authentication servers based on UD2 being subscribed to the one or more authentication servers.

In some implementations, the system and/or method may determine whether UD2 is subscribed to the authentication server(s), and may facilitate the exchange of the parameters based on determining that UD2 is subscribed to the authentication server(s). Additionally, or alternatively, the system and/or method may prevent the exchange of the parameters based on determining that UD2 is not subscribed to the authentication server(s), thereby reducing network traffic associated with exchanging the parameters.

In some implementations, the authentication server(s) may include a Bootstrapping Function (BSF) server, a Network Application Function (NAF) server, and/or some other server. Multiple layers of authentication (e.g., in accordance with a generic bootstrapping architecture (GBA) authentication process and/or some other authentication process) may be used to allow the user devices to exchange parameters via the authentication servers. For example, the BSF server may authenticate UD1 and/or UD2 to communicate with the NAF server (e.g. to exchange parameters, between UD1 and UD2, used to generate a security key).

Figure 1A:
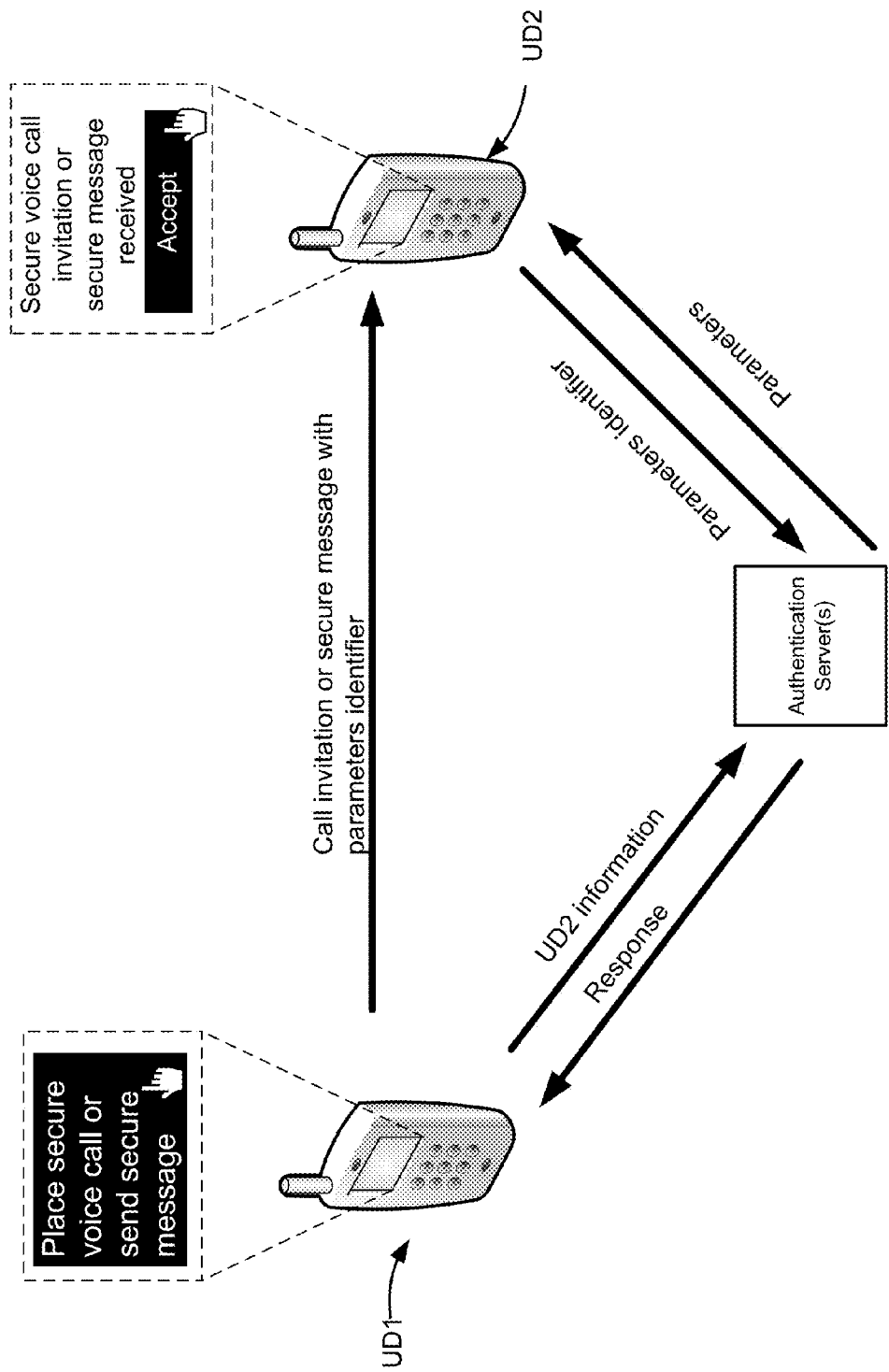
FIGS. 1A-1C illustrate example overviews of implementations described herein.

FIG. 1A illustrates an example overview of an implementation described herein. As shown in FIG. 1A, a sending user device (i.e., "UD1") may send information regarding a receiving user device (i.e. "UD2") to the authentication server(s) based on receiving an instruction to place a secure voice call or a secure video call or send a secure message (e.g., from a user associated with UD1) from UD1 to UD2. The authentication server(s) may send a response to UD1. In some implementations, the response may include an indication that UD2 is subscribed to the authentication server(s). Alternatively, the response may include an indication that UD2 is not subscribed to the authentication server(s) and may further include options to allow UD1 to place an unsecure call, send an unsecure message, or cancel the instruction to place the secure call or send the secure message. As a result, network traffic, associated with exchanging parameters, may be reduced when UD2 is not subscribed to the authentication server(s).

In FIG. 1A, assume that the response includes an indication that UD2 is subscribed to the authentication server(s). UD1 may store a parameters identifier (e.g., a token or some other identifier) in a call invitation or a secure message, associated with the instruction to place a secure voice call or a secure video call or send a secure message, and send the call invitation or the secure message to UD2. UD2 may receive the parameters identifier (e.g., as part of the call invitation or the secure message) and may send the parameters identifier to the authentication server(s). UD2 may receive parameters, associated with the parameters identifier, from the authentication server(s) based on the authentication server(s) authenticating UD2. As described above, UD2 may generate a security key based on the parameters and may use the security key to decrypt a secure message or to establish a secure connection with UD1 (e.g., to establish a voice call or a video call with UD1).

Figure 1B:
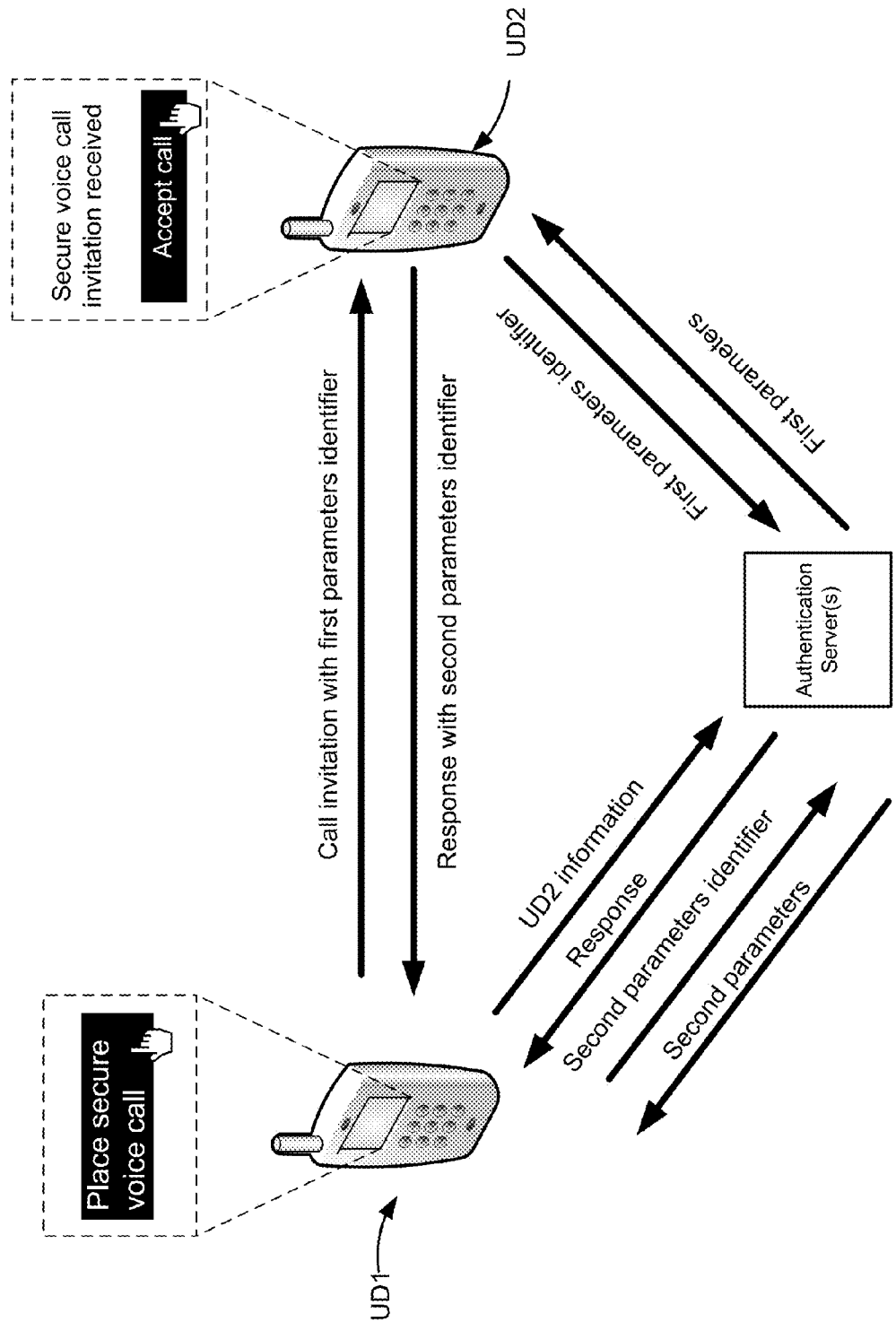

FIG. 1B illustrates an example of an overview implementation described herein. As shown in FIG. 1B, assume that UD1 receives an instruction (e.g., via a user, associated with UD1) to place a secure voice call or a secure video call from UD1 to UD2. In some implementations, UD1 may send information regarding UD2 to the authentication server(s) and may receive a response from the authentication server(s) indicating that UD2 is subscribed to the authentication server(s). Further, UD1 may send a call invitation to UD2 based on UD1 receiving an indication that UD2 is subscribed to the authentication server(s). In some implementations, the call invitation may include a first parameters identifier (e.g., a token or some other identifier) associated with first parameters (e.g., parameters associated with UD1). For example, UD1 may identify first parameters based on information embedded in a subscriber identity module (SIM) card of UD1.

As further shown in FIG. 1B, UD2 may send a response to UD1 including a second parameters identifier (e.g., a token or some other identifier) associated with parameters of UD2. UD1 may send the second parameters identifier to the authentication server(s) and may receive second parameters (e.g., parameters associated with the UD2) from the authentication server(s) based on the second parameters identifier. In some implementations, UD1 may generate a security key based on the first parameters and the second parameters.

As further shown in FIG. 1B, UD2 may send the first parameters identifier to the authentication server(s) and may receive first parameters (e.g., parameters associated with UD1) from the authentication server(s) based on the first parameters identifier. In some implementations, UD2 may generate a security key based on the first parameters and the second parameters. As a result, UD1 and UD2 may generate identical security keys and may establish a secure connection with each other (e.g., to place a voice call or a video call) based on each of UD1 and UD2 generating respective security keys.

Figure 1C:
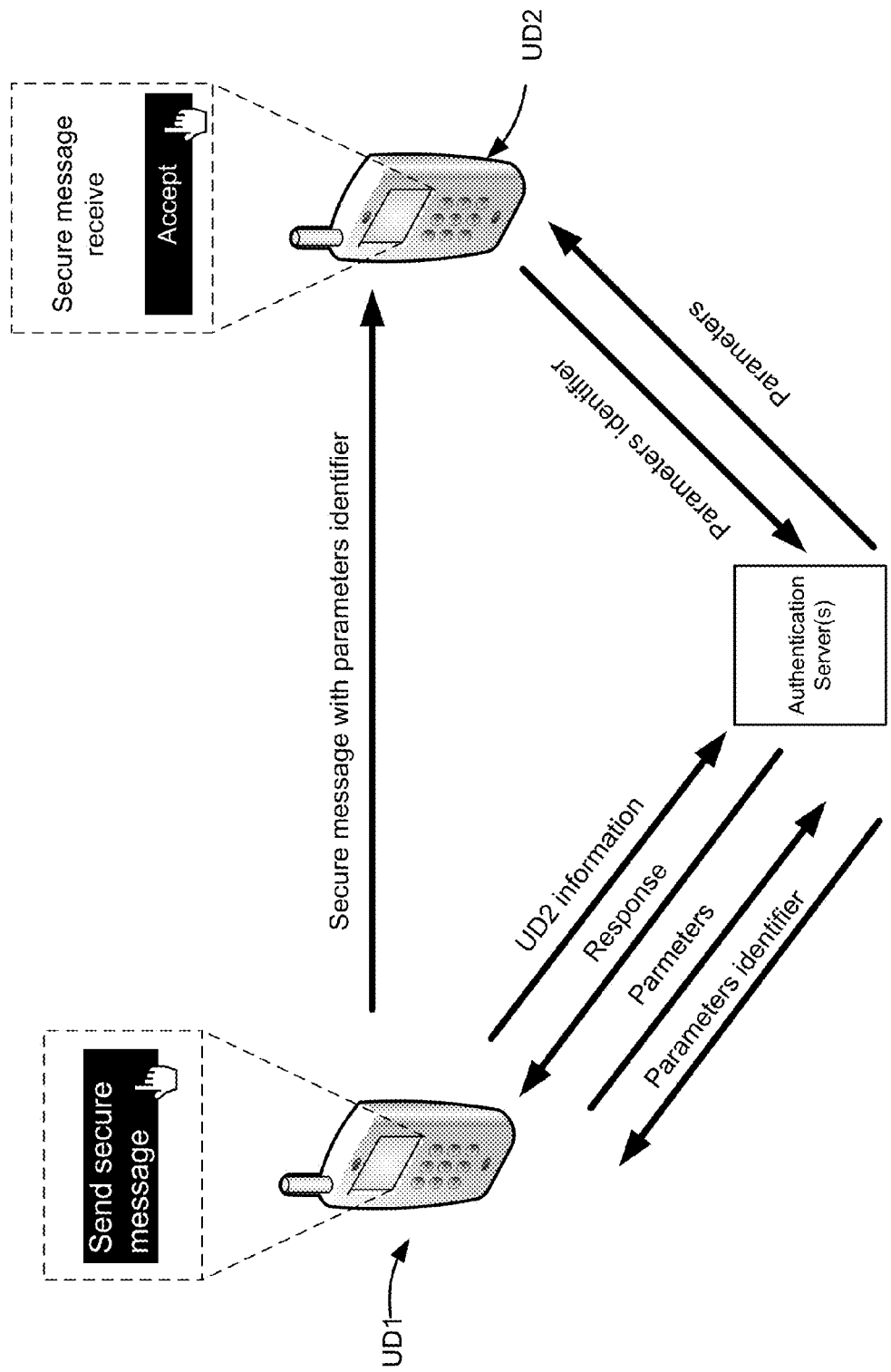

FIG. 1C illustrates an example overview of an implementation described herein. As shown in FIG. 1C, assume that UD1 receives an instruction (e.g., via a user, associated with UD1) to send a secure message. In some implementations, UD1 may send information regarding UD2 to the authentication server(s). As described above, UD1 may receive a response indicating that UD2 is subscribed to the authentication server(s). In some implementations, UD1 may generate a key based on parameters of UD1, encrypt the secure message, store a parameters identifier (e.g., a token) in the secure message, and send the secure message to UD2. UD2 may receive the parameters identifier (e.g., as part of the secure message), send the parameters identifier to the authentication server(s), and receive parameters associated with the parameters identifier. As described above, UD2 may generate a security key to decrypt the secure message based on the parameters.

While examples, described with respect to FIGS. 1A-1C are described in terms of two user devices (i.e., "UD1" and "UD2") establishing a secure connection to place a voice call or a video call or sending a secure message, in practice, the examples in FIGS. 1A-1C are not so limited and may apply to an environment with any number of user devices to establish a secure connection or send a secure message for any other purpose. For example, FIGS. 1A-1C may apply in an environment with any number of sending user devices exchanging information with any number of receiving user devices. Further, a single user device may perform the functions of both a sending user device and a receiving user device.

Figure 2:
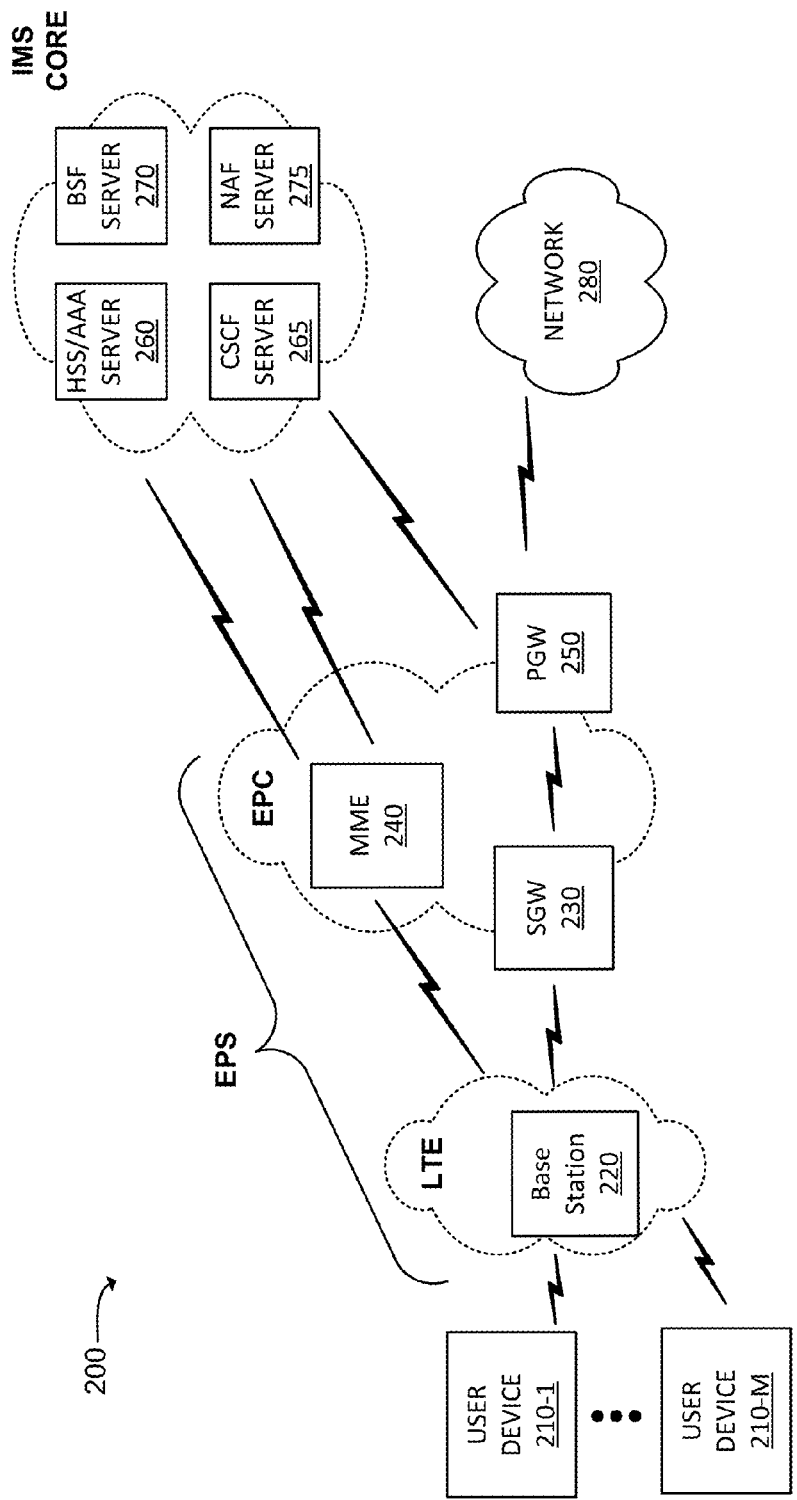
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include user devices 210 . . . 210-M (where M≥1), a base station 220, a serving gateway 230 (referred to as "SGW 230"), a mobility management entity device 240 (referred to as "MME 240"), a packet data network (PDN) gateway (PGW) 250, a home subscriber server (HSS)/authentication, authorization, accounting (AAA) server 260 (referred to as an "HSS/AAA server 260"), a call service control function (CSCF) server 265 (referred to as "CSCF server 265"), a bootstrapping function sever 270 (referred to as "BSF server 270"), a network authentication function server 275 (referred to as "NAF server 275"), and a network 280. The quantity of devices and/or networks, illustrated in FIG. 2, is provided for explanatory purposes only. In practice, there may be additional devices and/or networks; fewer devices and/or networks; different devices and/or networks; or differently arranged devices and/or networks than illustrated in FIG. 2.

In some implementations, one or more of the devices of environment 200 may perform one or more functions described as being performed by another one or more of the devices of environment 200. Devices of environment 200 may interconnect via wired connections, wireless connections, or a combination of wired and wireless connections.

Environment 200 may include an evolved packet system (EPS) that includes a long term evolution (LTE) network and/or an evolved packet core (EPC) that operate based on a third generation partnership project (3GPP) wireless communication standard. The LTE network may be a radio access network (RAN) that includes one or more base stations, such as eNodeBs (eNBs), via which user device 210 communicates with the EPC. The EPC may include SGW 230, MME 240, and/or PGW 250 that enables user device 210 to communicate with network 280 and/or an Internet protocol (IP) multimedia subsystem (IMS) core. The IMS core may include HSS/AAA server 260, CSCF server 265, BSF server 270 and/or NAF server 275 and may manage authentication, connection initiation, account information, a user profile, etc. associated with user device 210. As shown in FIG. 2, the LTE network may include base station 220, and the EPC may include SGW 230, MME 240, and/or PGW 250.

User device 210 may include any computation or communication device, such as a wireless mobile communication device that is capable of communicating with base station 220 and/or a network (e.g., network 280). For example, user device 210 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a laptop computer, a tablet computer, a camera, a personal gaming system, or another type of computation or communication device. User device 210 may send data to and/or receive data from network 280.

User device 210 may execute applications stored in a memory associated with user device 210. User device 210 may also, or alternatively, communicate, via network 280, with a content provider to obtain content (e.g., video content, image content, advertising content, etc.) and/or access a service and/or application (e.g., via a website hosted by a content provider).

User device 210 may also correspond to a sending user device (referred to as "UD1") and/or a receiving user device (referred to as "UD2") with regard to FIG. 1. Further, it will be apparent that, at any given time, user device 210 may function as a receiving user device or as a sending user device. Additionally, or alternatively, a single user device 210 may perform the functions of both a receiving user device and a sending user device.

Base station 220 may include one or more network devices that receive, process, and/or transmit traffic, such as audio, video, text, and/or other data, destined for and/or received from user device 210. In an example implementation, base station 220 may be an eNB device and may be part of the LTE network. Base station 220 may receive traffic from and/or send traffic to network 280 via SGW 230 and PGW 250. Base station 220 may send traffic to and/or receive traffic from user device 210 via an air interface. One or more of base stations 220 may be associated with a RAN, such as the LTE network.

SGW 230 may include one or more network devices, or other types of computation or communication devices, that gather, process, search, store, and/or provide information in a manner described herein. SGW 230 may include one or more data processing and/or traffic transfer devices, such as a gateway, a router, a modem, a switch, a firewall, a network interface card (NIC), a hub, a bridge, a proxy server, an optical add-drop multiplexer (OADM), or some other type of device that processes and/or transfers traffic. SGW 230 may, for example, aggregate traffic received from one or more base stations 220 and may send the aggregated traffic to network 280 via PGW 250. In one example implementation, SGW 230 may route and forward user data packets, may act as a mobility anchor for a user plane during inter-eNB handovers, and may act as an anchor for mobility between LTE and other 3GPP technologies. For idle state user device 210, SGW 230 may terminate a downlink (DL) data path and may trigger paging when DL data arrives for user device 210.

MME 240 may include one or more computation or communication devices that gather, process, search, store, and/or provide information in a manner described herein. For example, MME 240 may perform operations associated with a handoff to and/or from the EPS. MME 240 may perform operations to register user device 210 with the EPS, to handoff user device 210 from the EPS to another network, to handoff a user device 210 from the other network to the EPS, and/or to perform other operations. MME 240 may perform policing operations for traffic destined for and/or received from user device 210. MME 240 may authenticate user device 210 (e.g., via interaction with HSS/AAA server 260).

PGW 250 may include one or more network devices that gather, process, search, store, and/or provide information in a manner described herein. PGW 250 may include one or more data processing and/or traffic transfer devices, such as a gateway, a router, a modem, a switch, a firewall, a NIC, a hub, a bridge, a proxy server, an OADM, or some other type of device that processes and/or transfers traffic. PGW 250 may, for example, provide connectivity of user device 210 to external packet data networks by being a traffic exit/entry point for user device 210. PGW 250 may perform policy enforcement, packet filtering, charging support, lawful intercept, and/or packet screening. PGW 250 may also act as an anchor for mobility between 3GPP and non-3GPP technologies.

HSS/AAA server 260 may include one or more computation or communication devices, such as a server device. In some implementations, HSS/AAA server 260 may include a device that gathers, processes, searches, stores, and/or provides information in a manner described herein. For example, HSS/AAA server 260 may manage, update, and/or store, in a memory associated with HSS/AAA server 260, profile information associated with user device 210 that identifies applications and/or services that are permitted for and/or accessible by user device 210, bandwidth or data rate thresholds associated with the applications or services, information associated with a user of user device 210 (e.g., a username, a password, a personal identification number (PIN), etc.), rate information, minutes allowed, and/or other information. Additionally, or alternatively, HSS/AAA server 260 may include a device that performs authentication, authorization, and/or accounting (AAA) operations associated with a communication connection with user device 210.

CSCF server 265 may include one or more computation or communication devices, such as a server device. In some implementations, CSCF server 265 may include a device that gathers, processes, searches, stores, and/or provides information in a manner described herein. CSCF server 265 may process and/or route calls to and from user device 210 via the EPC. For example, CSCF server 265 may process calls, received from network 280, that are destined for user device 210. In another example, CSCF server 260 may process calls, received from user device 210, that are destined for network 280.

BSF server 270 may include one or more computation or communication devices, such as a server device. In one implementation, BSF server 270 may include a server device that gathers, processes, searches, and/or provides information in a manner described herein. In one example implementation, BSF server 270 may identify and/or send information to HSS/AAA server 260 and/or NAF server 275, regarding authentication of user device 210 for a service (e.g., a secure messaging service). Additionally, or alternatively, BSF server 270 may authenticate user device 210 to access NAF server 275 (e.g., by providing user device 210 with a key and/or some other instrument) to send and/or receive parameters (or some other information) to and/or from NAF server 275. In some implementations, BSF server 270 may identify authentication information of user device 210 based on a GBA technique in which BSF server 270 determines if user device 210 is authorized to use a service (e.g., secure voice calling services, secure video calling services) and if user device 210 is currently in an authorized connection with network 280. In another implementation, BSF server 270 may identify authentication information of user device 210 using any other technique.

NAF server 275 may include one or more computation or communication devices, such as a server device. In one implementation, NAF server 275 may include a server device that gathers, processes, searches, and/or provides information in a manner described herein. In some example implementations, NAF server 275 may permit user device 210 to access a service (e.g., a secure voice service), based on authentication information received from HSS/AAA server 260 and/or BSF server 270. NAF server 275 may interact with HSS/AAA server 260 and/or BSF server 270 to initiate authentication functions of user device 210. Additionally, or alternatively, NAF server 275 may interact with user device 210 to receive authentication information and present authentication information to HSS/AAA server 260 and/or BSF server 270.

Additionally, or alternatively, NAF server 275 may interact with HSS/AAA server 260 and/or BSF server 270 to authenticate user device 210 to use application services (e.g., secure voice application services, secure video application services) and/or to receive and/or send parameters (e.g., sender parameters and/or receiver parameters) from/to user device 210. Additionally, or alternatively, NAF server 275 may receive information regarding user device 210 and may determine whether user device 210 is subscribed to NAF serve 275. In one implementation, the interactions between NAF server 275, user device 210, HSS/AAA server 260, and/or BSF server 270 may be performed using the hypertext transfer protocol (HTTP) or the secure HTTP (HTTPS). In one implementation, the interactions between NAF server 275, user device 210, HSS/AAA server 260, and/or BSF server 270 may be performed using another type of protocol.

Network 280 may include one or more wired and/or wireless networks. For example, network 280 may include a cellular network, a public land mobile network (PLMN), a second generation (2G) network, a third generation (3G) network, a fourth generation (4G) network, a fifth generation (5G) network, and/or another network. Additionally, or alternatively, network 280 may include a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks.

While environment 200 has been described in terms of an EPS, this need not be the case. In another implementation, environment 200 may include devices associated with a system that does not include an LTE, an EPC and/or an IMS core.

Figure 3:
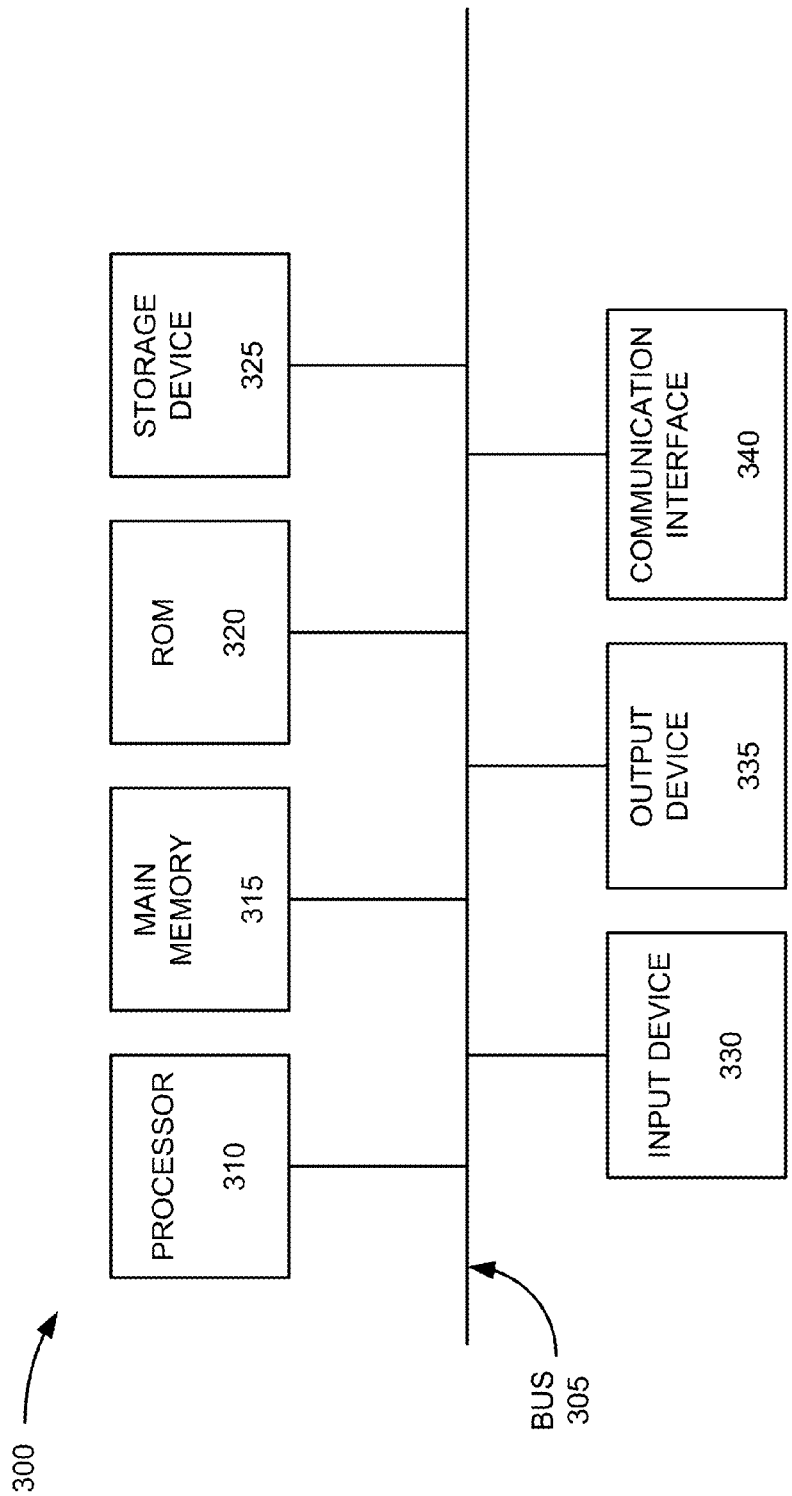
FIG. 3 illustrates example components of a device that may be used within the environment of FIG. 2.

FIG. 3 illustrates example components of a device 300 that may be used within environment 200 of FIG. 2. Device 300 may correspond to user device 210 and/or servers 260-275. Each of user device 210 and/or servers 260-275 may include one or more devices 300.

As shown in FIG. 3, device 300 may include a bus 305, a processor 310, a main memory 315, a read only memory (ROM) 320, a storage device 325 (also referred to as a local storage device or local storage), an input device 330, an output device 335, and a communication interface 340. In some implementations, device 300 may include additional components, fewer components, different components, or differently arranged components.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a mechanism that permits an operator to input information to device 300, such as a control button, a keyboard, a keypad, or another type of input device. Output device 335 may include a mechanism that outputs information to the operator, such as a light emitting diode (LED), a display, or another type of output device. Communication interface 340 may include any transceiver-like mechanism that enables device 300 to communicate with other devices or networks. In one implementation, communication interface 340 may include a wireless interface, a wired interface, or a combination of a wireless interface and a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include space within a single physical storage device or spread across multiple physical storage devices.

The software instructions may be read into main memory 315 from another computer-readable medium, such as storage device 325, or from another device via communication interface 340. The software instructions contained in main memory 315 may cause processor 310 to perform processes that will be described later. Alternatively, hardwired circuitry may be used in place of or in combination with software instructions to implement processes described herein. Thus, implementations described herein are not limited to any specific combination of hardware circuitry and software.

Figure 4:
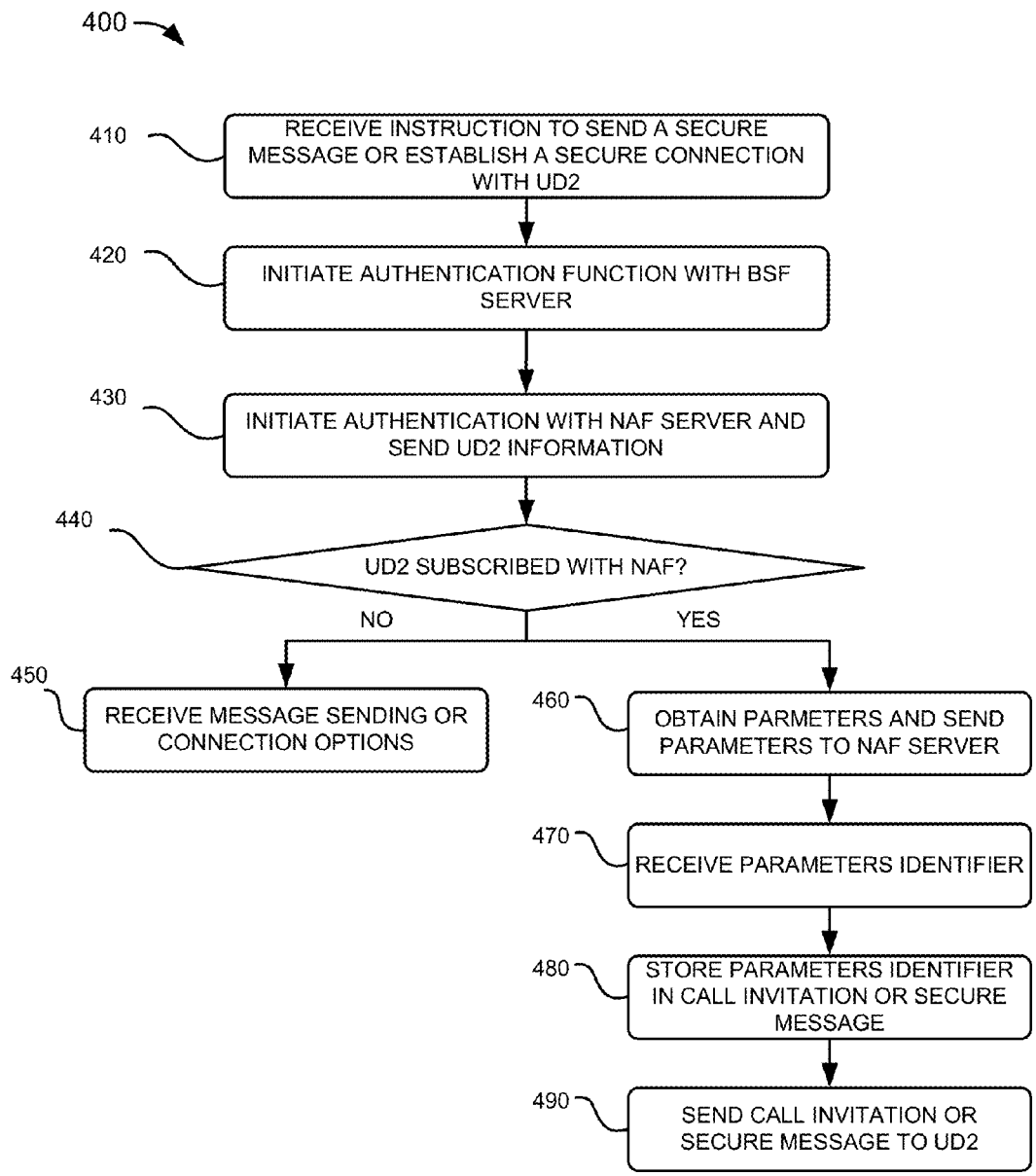
FIG. 4 illustrates a flowchart of an example process for sending a secure call invitation or secure message to a user device.

FIG. 4 illustrates a flowchart of an example process 400 for sending a secure call invitation or a secure message to a user device. In one implementation, process 400 may be performed by one or more components of user device 210, such as processor 310 of user device 210. In another implementation, one or more blocks of process 400 may be performed by one or more components of another device (e.g., server 270 and/or server 275), or any group of devices including or excluding user device 210.

Process 400 may describe an example where a sending user device 210 (i.e., "UD1") may send a parameters identifier to a receiving user device 210 (i.e., "UD2") based on receiving an indication that UD2 is subscribed to NAF server 275. In some implementations, UD2 may receive parameters based on the parameters identifier and may generate a security key based on the parameters. The security key may be used to establish a secure connection (e.g., to establish a voice call or a video call with UD1) or to decrypt an encrypted message sent by UD1. In some implementations, UD2 may receive the parameters based on the parameters identifier via servers 270-275 using multiple layers of authentication (e.g., in accordance with a GBA authentication process and/or some other authentication process).

As shown in FIG. 4, process 400 may include receiving an instruction to send a secure message or establish a secure connection with UD2 (block 410). For example, UD1 may receive an instruction from a user, associated with UD1, to send a secure message to UD2 or to establish a secure connection with UD2 (e.g., in order to place a voice call or a video call with UD2). In some implementations, the instruction to send a secure message or establish a secure connection may include a secure message or a call invitation directed to UD2.

Process 400 may further include initiating an authentication function with BSF server 270 (block 420). For example, UD1 may initiate an authentication function with BSF server 270 based on receiving the instruction to establish a secure connection or send a secure message. In some implementations, UD1 may receive a server key to access NAF server 275 based on BSF server 270 authenticating UD1 (e.g., via a GBA process or some other authentication process).

Process 400 may further include initiating authentication with NAF server 275 and sending UD2 information (block 430). For example, UD1 may send an authentication request to access NAF server 275 based on receiving the server key from BSF server 270, as described above. Additionally, UD1 may send information regarding UD2 to NAF server 275 based on NAF server 275 authenticating UD1 (e.g., via a GBA process or some other authentication process).

Process 400 may also include determining whether UD2 is subscribed with NAF server 275 (block 440). For example, UD1 may receive a response from NAF server 275 based on sending information regarding UD2 to NAF server 275. In some implementations, the response may indicate whether UD2 is subscribed to NAF server 275.

If, for example, the response indicates that UD2 is not subscribed to NAF server 275 (block 440-NO), process 400 may include receiving message sending or connection options (block 450). For example, UD1 may receive options regarding the instruction to send the secure message or establish the secure connection, such as an option to send an unsecure message, an option to establish an unsecured connection, an option to cancel the instruction to send a secure message or establish the secure connection, or some other option. As a result, network activity, associated with exchanging parameters may be reduced when UD2 is not subscribed to NAF server 275.

If, on the other hand, the response indicates that UD2 is subscribed to NAF server 275 (block 440-YES), process 400 may further include obtaining parameters and providing the parameters to NAF server 275 (block 460). For example, as described above, UD1 may receive parameters (e.g., parameters associated with UD1) from BSF server 270. Alternatively, UD1 may determine and/or receive parameters independent of BSF server 270 (e.g., UD1 may internally determine the parameters). In some implementations, the parameters may be determined based on information embedded within a SIM card associated with UD1. UD1 may provide the parameters to NAF server 275 based on determining that UD2 is subscribed to NAF server 275.

Process 400 may further include receiving a parameters identifier (block 470). For example, UD1 may receive the parameters identifier (e.g., a token or some other identifier) based on providing the parameters to NAF server 275.

Process 400 may also include storing the parameters identifier in a call invitation or in a secure message (block 480). For example, UD1 may store the parameters identifier in the call invitation or in the secure message associated with the instruction to send a secure message or establish a secure connection with UD2.

Process 400 may further include sending the call invitation or the secure message to UD2 (block 490). For example, UD1 may send the call invitation or the secure message to UD2 via secure channel protocols, such that UD2 may receive the parameters identifier stored by the call invitation or the secure message. As described above, UD2 may provide the parameters identifier to NAF server 275 to receive the parameters associated with the parameters identifier and to generate a security key based on the parameters.

While an example of process 400 is described in FIG. 4 in terms of two user devices (i.e., "UD1" and "UD2"), in practice, process 400 is not so limited and may apply to an environment with any number of user devices 210. For example, process 400 may apply in an environment with any number of sending user devices exchanging information with any number of receiving user devices. Further, a single user device 210 may perform the functions of both a sending user device and a receiving user device.

In some implementations, block 420 may be omitted in a situation where UD1 already has a key to access NAF server 275 and/or has already been authenticated with BSF server 270 and/or NAF server 275. For example, UD1 may be authenticated with BSF server 270 and/or NAF server 275 based on UD1 having previously initiated an authentication function with BSF server 270 when performing a task requiring authentication with BSF server 270 (e.g., placing a secure voice call or a secure video call, sending a secure message, etc.).

Figure 5A:
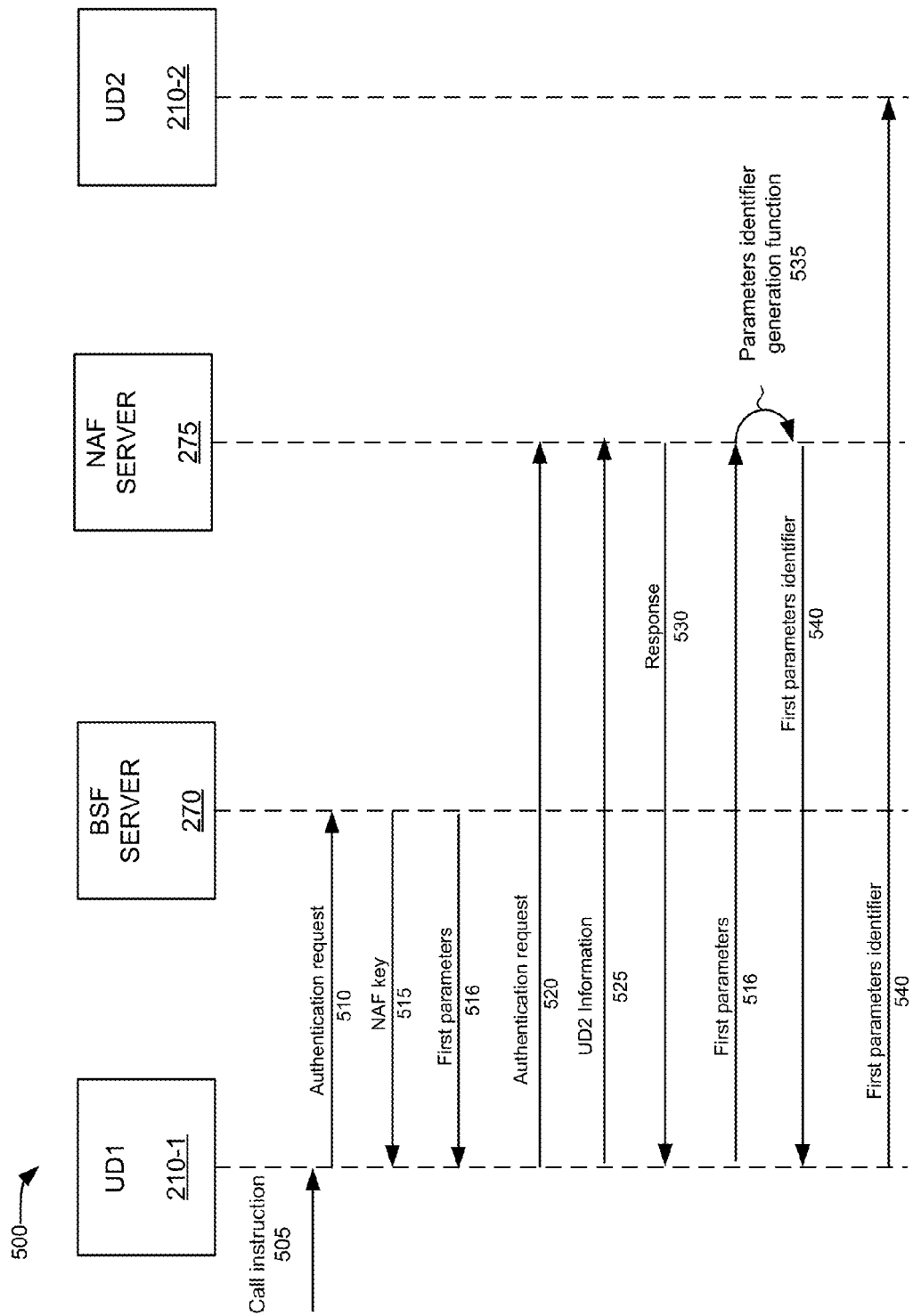
FIGS. 5A-5C illustrate a call flow diagram of example operations capable of being performed by an example portion of the environment of FIG. 2.
Figure 5B:
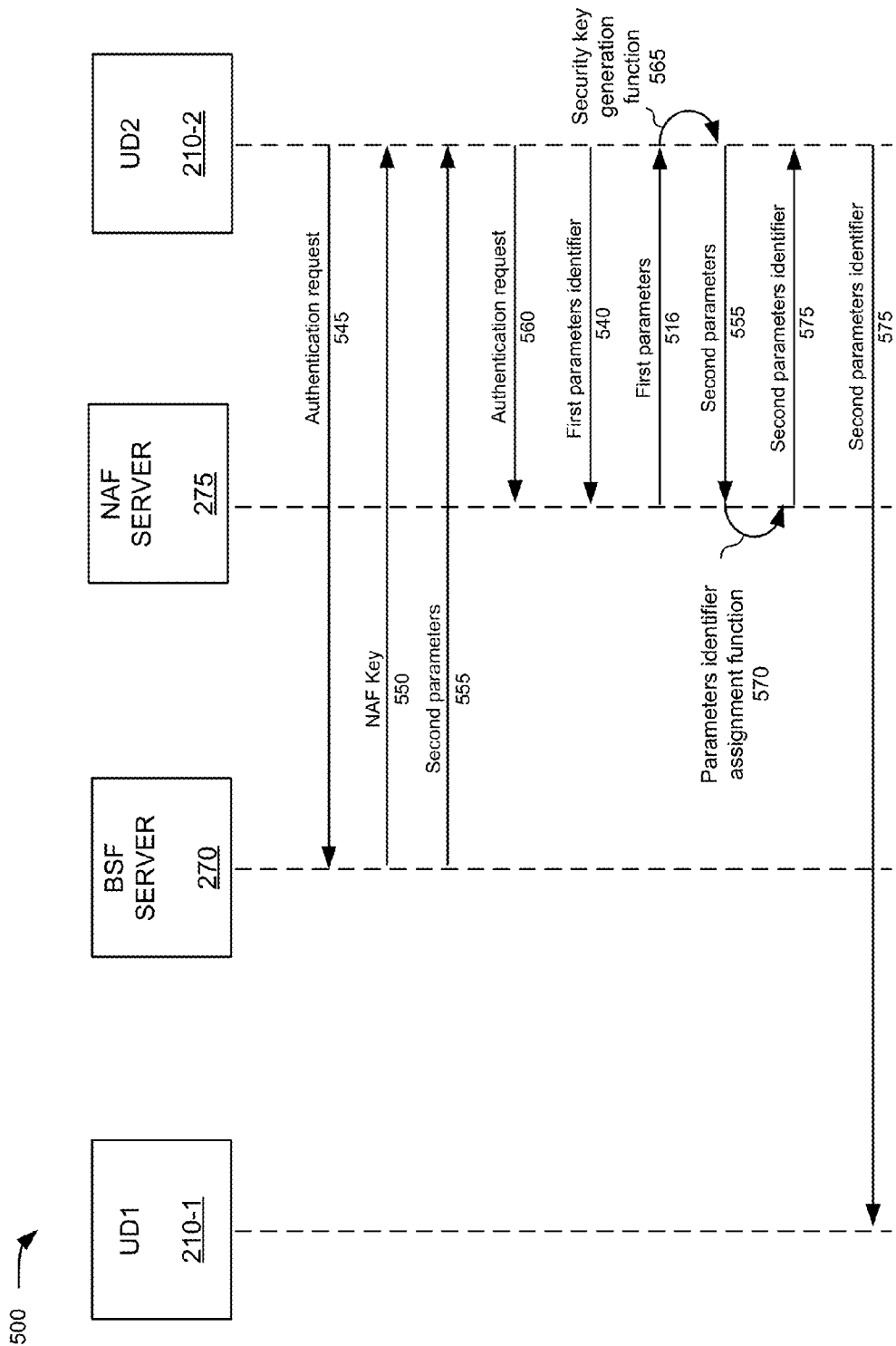
Figure 5C:
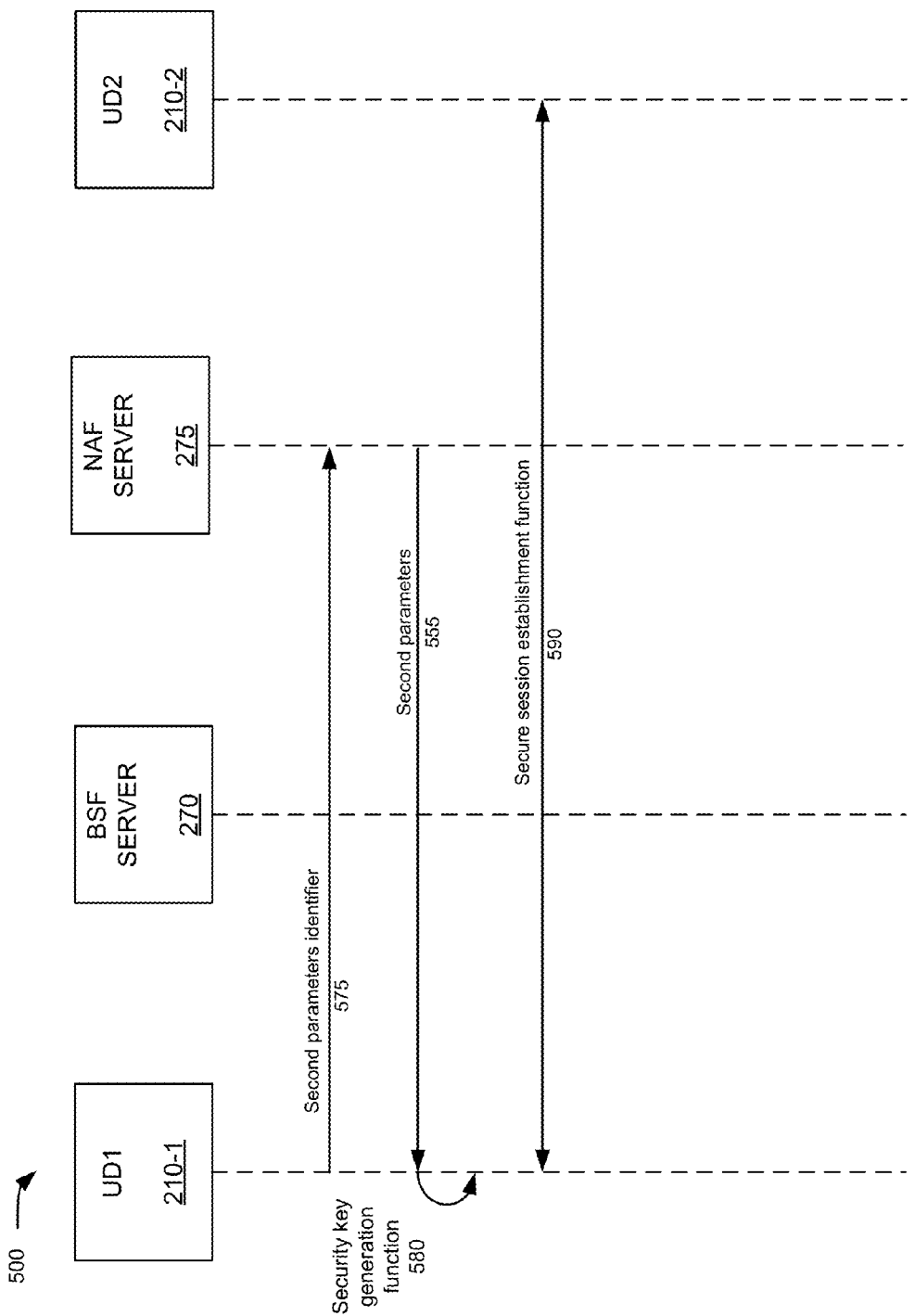

FIGS. 5A-5C illustrate a call flow diagram of example operations capable of being performed by an example portion 500 of environment 200. As shown in FIGS. 5A-5C, portion 500 may include a sending user device 210 (shown as "UD1"), BSF server 270, NAF server 275, and a receiving user device 210 (shown as "UD2"). UD1, BSF server 270, NAF server 275, and UD2 may include components and/or perform functions described above in connection with, for example, one or more of FIGS. 1-3. FIGS. 5A-5C may correspond to example operations to identify first parameters, associated with UD1, and to identify second parameters, associated with UD2. FIGS. 5A-5C may also correspond to example operations for exchanging the parameters between UD1 and UD2 via BSF server 270 and/or NAF server 275 using multiple layers of authentication (e.g., in accordance with a GBA process and/or some other process). FIGS. 5A-5C may also correspond to example operations for generating security keys based on the first parameters and the second parameters and establishing a secure connection between UD1 and UD2 (e.g., to establish a secure voice call connection or a secure video call connection) based on the security keys.

As shown in FIG. 5A, UD1 may receive call instruction 505. For example, UD1 may receive call instruction 505 based on receiving an input from a user, associated with UD1 (e.g., via a keypad, keyboard, a microphone, or the like, associated with UD1). In one example, the user may input call instruction 505, to place a secure voice call or a secure video call to UD2.

UD1 may send authentication request 510 based on receiving call instruction 505. Authentication request 510 may include a request for a server key, such as a NAF key (e.g., to access NAF server 275). Authentication request 510 may also cause UD1 to initiate an authentication function with BSF server 270.

BSF server 270 receive authentication request 510 and may send NAF key 515 to UD1 based on successful authentication of UD1 to receive NAF key 515. In some implementations, UD1 may access NAF server 275 based on NAF key 515. Additionally, or alternatively, BSF server 270 may initiate an authentication function (e.g., a bootstrapping function in accordance with a GBA authentication process and/or some other process) to authenticate UD1 to receive NAF key 515.

In some implementations, UD1 may already possess NAF key 515 if a connection already exists between UD1 and BSF server 270 (e.g., UD1 may have established a connection with BSF server 270 to access a service including or excluding a secure voice call service or a secure video call service). In such a case, UD1 may forgo sending authentication request 510.

In some implementations, BSF server 270 may determine first parameters 516 (e.g., parameters associated with the sending device, (i.e., UD1)) and may provide the first parameters 516 to UD1 based on successful authentication of UD1. Alternatively, UD1 may determine and/or receive first parameters 516 independent of BSF server 270 (e.g., UD1 may internally determine first parameters 516). First parameters 516 may be determined based on information embedded within a SIM card associated with UD1 (e.g., integrated circuit card identification (ICCID), international mobile subscriber identity (IMSI), international mobile equipment identify (IMEI), Ki authentication key, local area identity (LAI), short message service center (SMSC) number, service provider name (SPN), service dialing numbers (SDN), and/or some other information). Additionally, or alternatively, first parameters 516 may be based on information in accordance with the 3GPP specification, such as information associated with a master key in HSS/AAA server 260, a BSF Transaction ID (B-TID), and/or a terminal app ID (e.g., a parameter that identifies a particular type of application, such as a secure communication application). Additionally, or alternatively, first parameters 516 may be determined based on some other information, process, rule, and/or algorithm.

In some implementations, UD1 may send authentication request 520 to access NAF server 275 based on receiving NAF key 515 from BSF server 270. In some implementations, authentication request 520 may include NAF key 515. NAF server 275 may initiate an authentication function of UD1 and authenticate UD1 based on receiving authentication request 520 and/or NAF key 515 from UD1. UD1 may access NAF server 275 to provide NAF server 275 with UD2 information 525 (e.g., information for the receiving user device 210 associated with call instruction 505) via a secure channel protocol or some other protocol.

UD1 may receive response 530 from NAF server 275 based on providing NAF server 275 with UD2 information 525. In some implementations, response 530 may include an indication that UD2 is subscribed to NAF server 275. In some implementations, response 530 may indicate that UD2 is not subscribed to NAF server 275 and may include options for UD1 to establish an unsecure connection with UD2 or to cancel an instruction associated with establishing a secure connection with UD2. In FIGS. 5A-5C, assume that response 530 includes an indication that UD2 is subscribed to NAF server 275.

NAF server 275 may receive first parameters 516 from UD1 via a secure channel protocol or some other protocol. In some implementations, NAF server 275 may initiate parameters identifier generation function 535 and may generate an identifier (e.g., a token or some other identifier) associated with first parameters 516. NAF server 275 may generate first parameters identifier 540 based on parameters identifier generation function 535. In some implementations, UD1 may receive first parameters identifier 540 from NAF server 275 via a secure channel protocol or some other protocol. In some implementations, UD1 may send first parameters identifier 540 from UD2 (e.g., as part of a secure voice call invitation or a secure video call invitation).

Continuing with the above example, and as shown in FIG. 5B, UD2 may send authentication request 545 to BSF server 270 based on receiving first parameters identifier 540. Authentication request 545 may include a request for a NAF key, which UD2 may use to access NAF server 275.

BSF server 270 may send NAF key 550 to UD2 based on successful authentication of UD2 to receive NAF key 550. In some implementations, BSF server 270 may initiate an authentication function (e.g., a bootstrapping function in accordance with a GBA authentication process and/or some other process) to authenticate UD2 to receive NAF key 550. In some implementations, UD2 may already possess NAF key 550 if a connection already exists between UD2 and BSF server 270 (e.g., UD2 may have established a connection with BSF server 270 to access a service including or excluding a secure voice service or a secure video service). In such a case, UD2 may forgo initiating authentication request 545 to receive NAF key 550.

In some implementations, BSF server 270 may determine second parameters 555 (e.g., parameters associated with the receiving device, (i.e., UD2)) and may send second parameters 555 to UD2 based on successful authentication of UD2. Alternatively, UD2 may determine and/or receive second parameters 555 independent of BSF server 270 (e.g., UD2 may internally determine second parameters 555). Second parameters 555 may be determined based on information embedded within a SIM card associated with UD2 (ICCID, IMSI, IMEI, Ki authentication key, LAI, SMSC number, SPN, SDN, and/or some other information). Additionally, or alternatively, second parameters 555 may be based on information in accordance with the 3GPP specification, such as information associated with a master key in HSS/AAA server 260, a B-TID, and/or a terminal app ID. Additionally, or alternatively, second parameters 555 may be based on some other information, process, rule, and/or algorithm.

UD2 may send authentication request 560 to access NAF server 275 based on receiving NAF key 550 from BSF server 270. In some implementations, authentication request 560 may include NAF key 550. NAF server 275 may initiate an authentication function of UD2, based on receiving authentication request 560 and/or NAF key 550 from UD2. Additionally, or alternatively, NAF server 275 may receive authentication information from BSF server 270 to authenticate UD2 to access NAF server 275.

As described above, UD2 may receive first parameters identifier 540 (e.g., as part of a secure voice call invitation or a secure video call invitation). In some implementations, UD2 may send first parameters identifier 540 to NAF server 275, via a secure channel.

NAF server 275 may provide first parameters 516 to UD2, based on identifying first parameters 516 associated with first parameters identifier 540 and authenticating UD2 to receive first parameters 516. In some implementations, NAF server 275 may authenticate UD2 to receive first parameters 516 based on authentication information associated with first parameters identifier 540. For example, NAF server 275 may compare authentication information associated with first parameters identifier 540 with information associated with UD2 (e.g., IMEI, ICCID, and/or some other information), to authenticate UD2 to receive first parameters 516.

In some implementations, UD2 may execute security key generation function 565 to generate a security key based on first parameters 516 and based on second parameters 555. For example, UD2 may generate a security key using an advanced encryption standard (AES) and/or using some other algorithm.

In some implementations, UD2 may send second parameters 555 to NAF server 275 and NAF server 275 may initiate parameters identifier assignment function 570 to assign an identifier (e.g., a token or some other identifier) associated with second parameters 555. NAF server 275 may generate second parameters identifier 575 based on parameters identifier assignment function 570. In some implementations, UD2 may send second parameters identifier 575 to UD1 (e.g. as part of a response to the invitation, associated with first parameters identifier 540).

Continuing with the above example, and as shown in FIG. 5C, UD1 may send second parameters identifier 575 to NAF server 275 based on receiving second parameters identifier 575 from UD2. NAF server 275 may provide second parameters 555 to UD1 based on UD1 providing second parameters identifier 575 to NAF server 275. UD1 may initiate security key generation function 580 based on NAF server 275 providing second parameters 555 to UD1. In some implementations, UD1 may execute security key generation function 580 to generate a security key based on second parameters 555 and based on first parameters 516. For example, UD1 may generate a security key using an advanced encryption standard (AES) and/or using some other algorithm.

In some implementations, UD1 and UD2 may execute secure connection establishment function 590 based on the security keys generated by security key generation function 565 and security key generation function 580. For example, UD1 and UD2 may compare respective security keys and may establish a secure connection based on the respective security keys generated by security key generation function 565 and security key generation function 580.

Figure 6A:
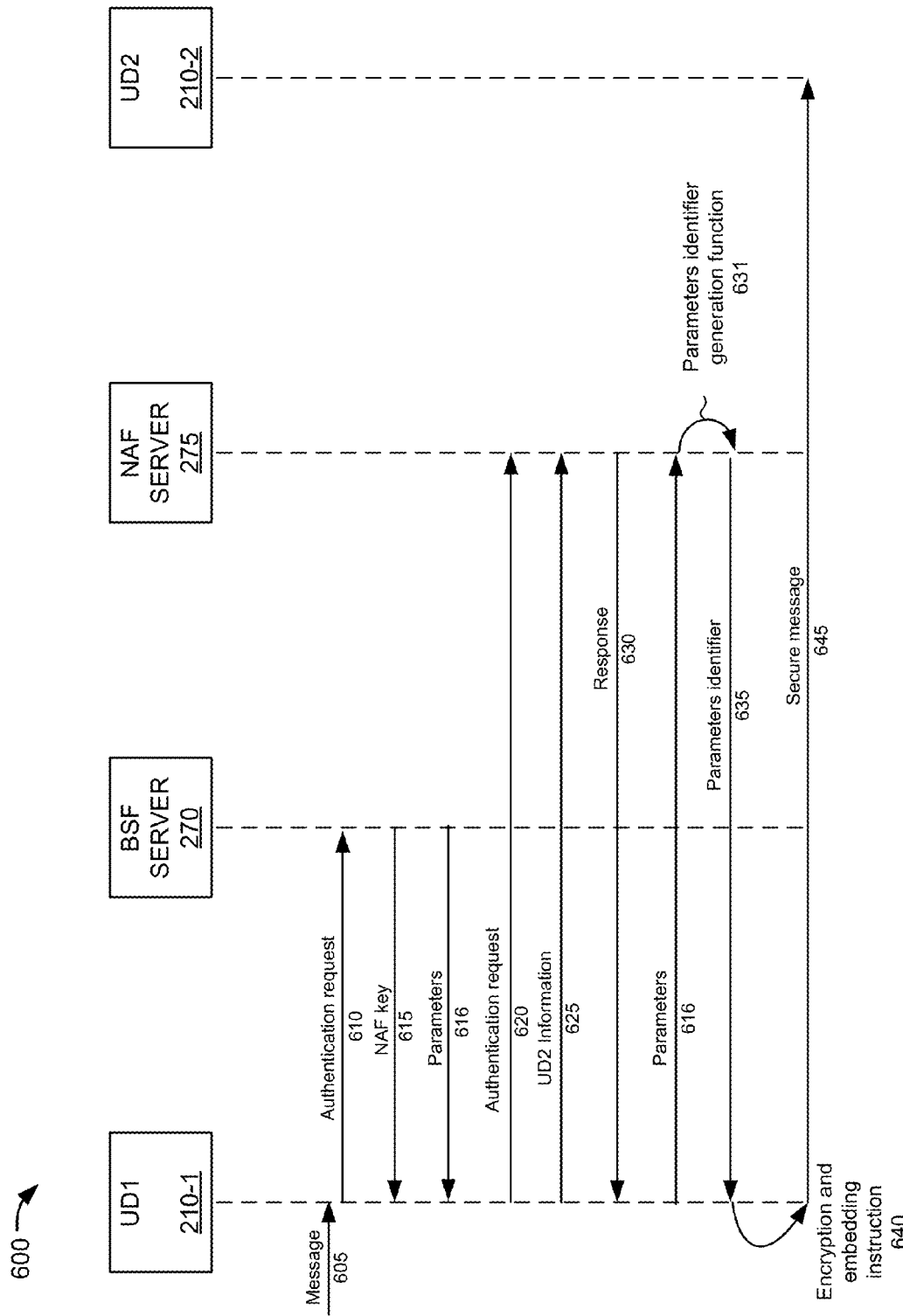

FIGS. 6A-6B illustrate a call flow diagram of example operations capable of being performed by an example portion 600 of environment 200. As shown in FIGS. 6A-6B, portion 600 may include a sending user device 210 (shown as "UD1"), BSF server 270, NAF server 275, and a receiving user device 210 (shown as, "UD2"). UD1, BSF server 270, NAF server 275, and UD2 may include components and/or perform functions described above in connection with, for example, one or more of FIGS. 1A-3. FIG. 6 may correspond to example operations to identify parameters for encrypting and/or decrypting a secure message. FIG. 6 may also correspond to example operations for exchanging the parameters between UD1 and UD2 via BSF server 270 and/or NAF server 275 using multiple layers of authentication (e.g., in accordance with a GBA process and/or some other process).

As shown in FIG. 6, UD1 may receive and/or generate message 605. For example, UD1 may generate message 605 based on receiving input from a user, associated with UD1 (e.g., via a keypad, keyboard, microphone, or the like, associated with UD1). In one example, the user may input text associated with message 605, identify the recipient of message 605, and instruct UD1 to make message 605 a secure message.

UD1 may send authentication request 610 based on receiving an instruction (e.g., via a user associated with UD1) to send message 605 to UD2 using a secure messaging application. Authentication request 610 may include a request for parameters, which may be used to generate an encryption key for message 605, and/or a request for a NAF key (to access NAF server). Authentication request 610 may also cause UD1 to initiate an authentication function with BSF server 270.

BSF server 270 may receive authentication request 610 and may send NAF key 615 to UD1 based on successful authentication of UD1 to receive NAF key 615. In some implementations, NAF key 615 may be used to allow UD1 to access NAF server 275. Additionally, or alternatively, BSF server 270 may initiate an authentication function (e.g., a bootstrapping function in accordance with a GBA authentication process and/or some other process) to authenticate UD1 to receive NAF key 615.

In some implementations, BSF server 270 may determine parameters 616 (e.g., parameters associated with the sending device, (i.e., UD1)) and may provide parameters 616 to UD1 based on successful authentication of UD1 to receive parameters 616. Alternatively, UD1 may determine and/or receive parameters 616 independent of BSF server 270 (e.g., UD1 may internally determine first parameters 616). Parameters 616 may be determined based on information embedded within a SIM card associated with UD1 (e.g., ICCID, IMSI, IMEI, Ki authentication key, LAI, SMSC number, SPN, SDN, and/or some other information). Additionally, or alternatively, parameters 616 may be based on information in accordance with the 3GPP specification, such as information associated with a master key in HSS/AAA server 260, a B-TID, and/or a terminal app ID (e.g., a parameter that identifies a particular type of application, such as a secure messaging application). Additionally, or alternatively, parameters 616 may be based on some other information, process, rule, and/or algorithm.

UD1 may send authentication request 620 to access NAF server 275 based on receiving NAF key 615 and parameters 616 from BSF server 270. In some implementations, authentication request 620 may include NAF key 615. NAF server 275 may initiate an authentication function of UD1 and authenticate UD1 based on receiving authentication request 620 and/or NAF key 615 from UD1. UD1 may access NAF server 275 to provide NAF server 275 with UD2 information 625 (e.g., information for the receiving user device 210 associated with secure message 605) via a secure channel protocol or some other protocol, and to provide NAF server 275 with parameters which UD2 may receive and use to decrypt a secure message.

UD1 my receive response 630 from NAF server 275 based on providing NAF server 275 with UD2 information 625. In some implementations, response 630 may include an indication that UD2 is subscribed to NAF server 275. In some implementations, response 630 may indicate that UD2 is not subscribed to NAF server 275 and may include options for UD1 to send an unsecured message to UD2 or to cancel an instruction associated with sending a secure message to UD2.

In FIGS. 6A-6B, assume that response 630 includes an indication that UD2 is subscribed to NAF server 275

NAF server 275 may receive parameters 616 from UD1 via a secure channel protocol or some other protocol. In some implementations, NAF server 275 may initiate parameters identifier generation function 631 and may generate an identifier (e.g., a token or some other identifier) associated with parameters 616. NAF server 275 may generate parameters identifier 635 based on parameters identifier generation function 631. In some implementations, UD1 may receive first parameters identifier 635 from NAF server 275 via a secure channel protocol or some other protocol.

UD1 may execute an encryption and embedding instruction 640 to encrypt message 605 based on parameters 616. Instruction 640 may also cause UD1 to store message 605 with parameters identifier 635, based on receiving parameters identifier 635 from NAF server 275. UD1 may generate secure message 645, based on executing instruction 640, as described above. As a result, secure message 645 may include parameters identifier 635, which is associated with parameters 616.

Continuing with the above example, UD2 may identify secure message 645 as a secure message based on a header of the message, based on parameters identifier 635 being embedded within the secure message, and/or based on some other indication.

As shown in FIG. 6B, UD2 may send authentication request 650 to BSF server 270 based on receiving secure message 645 and identifying the message as a secure message. Authentication request 650 may include a request for a NAF key, which may be used to access NAF server 275.

BSF server 270 may send NAF key 655 to UD2 based on successful authentication of UD2 to receive NAF key 655. In some implementations, BSF server 270 may initiate an authentication function (e.g., a bootstrapping function in accordance with a GBA authentication process and/or some other process) to authenticate UD2 to receive NAF key 655. In some implementations, UD2 may already possess NAF key 655 if a session already exists between UD2 and BSF server 270 (e.g., UD2 may have established a session with BSF server 270 to access a service including or excluding a secure messaging service). In such a case, UD2 may forgo initiating authentication request 650 to receive NAF key 655.

UD2 may send authentication request 660 to access NAF server 275 based on receiving NAF key 655 from BSF server 270. In some implementations, authentication request 660 may include NAF key 655. NAF server 275 may initiate an authentication function of UD2, based on receiving authentication request 660 and/or NAF key 655 from UD2. Additionally, or alternatively, NAF server 275 may receive authentication information from BSF server 270 to authenticate UD2 to access NAF server 275.

As described above, UD2 may receive secure message 645 embedded with parameters identifier 635. In some implementations, UD2 may read parameters identifier 635 from secure message 645 and send parameters identifier 635 to NAF server 275, via a secure channel.

NAF server 275 may send parameters 616 to UD2, based on identifying parameters 616 associated with parameters identifier 635 and authenticating UD2 to receive parameters 616. In some implementations, UD2 may execute message decryption instruction 670 to create a decryption key based on receiving parameters 616. UD2 may use the decryption key to decrypt secure message 645 and obtain the original message 605.

As described above, processes described with regard to process 400, call flow diagrams 5A-5C, and call flow diagrams 6A-6B may identify whether UD2 is associated with NAF server 275 and may prevent network activity associated with establishing a secure connection between UD1 and UD2 or sending a secure message from UD1 to UD2 in a situation where UD2 is not associated with NAF server 275. As a result, network processes, associated with exchanging parameters between UD1 and UD2 via NAF server 275 and establishing a secure connection between UD1 and UD2 or sending a secure message from UD1 to UD2, may be omitted in a situation where UD2 is not subscribed to NAF server 275.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIG. 4, the order of the blocks may be modified in other implementations. Further, non-dependent blocks may be performed in parallel. Additionally, while a series of operations have been described with regard to FIGS. 5A-5C and FIGS. 6A-6B, the order of the operations may be modified in other implementations. Further, non-dependent operations may be performed in parallel.

Also, while NAF server 275 and BSF server 270 are described as separate devices, in practice, NAF server 275 and BSF server 270 may implemented as one device. Additionally, or alternatively, one or more operations performed by NAF server 275 or BSF server 270 could be performed by another device, such as HSS/AAA server 260 and/or CSCF server 265.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
receiving, by a first device, an instruction to establish a secure connection with a second device or to send a secure message to the second device,
the instruction including a secure connection invitation or a message;
sending, by the first device, information associated with the second device to a first server;
receiving, by the first device, a response from the first server, the response indicating whether the second device is subscribed to the first server;
obtaining, by the first device, first parameters when the response indicates that the second device is subscribed to the first server;
communicating, by the first device, the first parameters to the first server;
receiving, by the first device and from the first server, a first parameters identifier associated with the first parameters;
storing, by the first device, the first parameters identifier in the secure connection invitation or the message; and
sending, by the first device, the secure connection invitation or the message to the second device,
the second device being capable of receiving the first parameters identifier stored by the secure connection invitation or the message to obtain the first parameters to aid in establishing the secure connection or to aid in decrypting the secure message.

2. The method of claim 1, further comprising:
receiving message sending options or connection options when the response indicates that the second device is not subscribed to the first server,
the connection options permitting the first device to establish an unsecured connection with the second device or to cancel the instruction to establish the secure connection with the second device, and
the message sending options permitting the first device to send an unsecured message to the second device or to cancel the instruction to send the secure message to the second device.

3. The method of claim 1,
where the instruction to establish the secure connection with the second device or to send the secure message to the second device is an instruction to establish the secure connection with the second device, and
where the method further comprises:
receiving a second parameters identifier from the second device based on sending the secure connection invitation to the second device;
communicating the second parameters identifier to the first server;
receiving, from the first server, second parameters based on communicating the second parameters identifier to the first server;
generating a security key based on the first parameters and the second parameters;
establishing the secure connection with the second device based on the security key; and
communicating with the second device using the secure connection.

4. The method of claim 1,
where the instruction to establish the secure connection with the second device or to send the secure message to the second device is an instruction to send the secure message to the second device, and
where the method further comprises:
generating a security key based on the first parameters; and
encrypting the message based on the security key to form the secure message,
storing the first parameters identifier in the message being based on forming the secure message.

5. The method of claim 1, further comprising:
initiating an authentication function with a second server;
receiving a server key from the second server to access the first server based on initiating the authentication function with the second server;
initiating an authentication function with the first server based on receiving the server key from the second server; and
receiving authorization to communicate with the first server based on the server key;
sending the information associated with the second device to the first server being based on receiving the authorization to communicate with the first server.

6. The method of claim 1, further comprising:
initiating an authentication function with a second server;
receiving authorization to communicate with the second server; and
receiving the first parameters from the second server based on receiving the authorization to communicate with the second server,
obtaining the first parameters being based on receiving the first parameters from the second server.

7. A system comprising:
a first device to:
receive an instruction to establish a secure connection with a second device or to send a secure message to the second device,
the instruction including a secure connection invitation or a message;
send information associated with the second device to a first server;
receive a response from the first server,
the response indicating whether the second device is subscribed to the first server;
receive message sending options or connection options based on the response indicating that the second device is not subscribed to the first server,
the connection options permitting the first device to establish an unsecured connection with the second device or to cancel the instruction to establish the secure connection with the second device, and
the message sending options permitting the first device to send an unsecured message to the second device or to cancel the instruction to send the secure message to the second device;
obtain first parameters, when the response indicates that the second device is subscribed to the first server;
communicate the first parameters to the first server;
receive, from the first server, a first parameters identifier associated with the first parameters;
store the first parameters identifier in the secure connection invitation or the message; and
send the secure connection invitation or the message to the second device,
the second device being capable of receiving the first parameters identifier stored by the secure connection invitation or the message to obtain the first parameters to aid in establishing the secure connection or to aid in decrypting the secure message.

8. The system of claim 7,
where the instruction to establish the secure connection with the second device or to send the secure message to the second device is an instruction to establish the secure connection with the second device, and
where the first device is further to:
receive a second parameters identifier from the second device based on sending the secure connection invitation to the second device;
communicate the second parameters identifier to the first server;
receive, from the first server, second parameters based on communicating the second parameters identifier to the first server;
generate a security key based on the first parameters and the second parameters;
establish the secure connection with the second device based on the security key; and
communicate with the second device using the secure connection.

9. The system of claim 7,
where the instruction to establish the secure connection with the second device or to send the secure message to the second device is an instruction to send the secure message to the second device,
where the first device is further to:
generate a security key based on the first parameters; and
encrypt the message based on the key to form the secure message, and
where, when storing the first parameters identifier in the message, the first device is to:
store the first parameters identifier in the message based on forming the secure message.

10. The system of claim 7,
where the first device is further to:
initiate an authentication function with a second server;
receive a server key from the second server to access the first server based on initiating the authentication function with the second server;
initiate an authentication function with the first server based on receiving the server key from the second server; and
receive authorization to communicate with the first server based on the server key, and
where, when sending the information associated with the second device to the first server, the first device is to:
send the information associated with the second device to the first server based on receiving the authorization to communicate with the first server.

11. The system of claim 7,
where the first device is further to:
initiate an authentication function with a second server;
receive authorization to communicate with the second server; and
receive the first parameters from the second server based on receiving authorization to communicate with the second server, and
where, when obtaining the first parameters, the first device is to:
obtain the first parameters based on receiving the first parameters from the second server.

12. A non-transitory computer-readable medium storing instructions, the instructions comprising:
a plurality of instructions, which, when executed by one or more processors associated with a first device, cause the one or more processors to:
receive an instruction to establish a secure connection with a second device or to send a secure message to the second device, the instruction to establish the secure connection with the second device or to send the secure message to the second device including a secure connection invitation or a message;
initiate an authentication function with a first server;
receive a server key from the first server to access a the second server based on initiating the authentication function with the second server;
initiate an authentication function with the second server based on receiving the server key from the first server;
receive authorization to communicate with the second server based on the server key;
send information associated with the second device to the second server based on receiving the authorization to communicate with the second server;
receive a response from the second server,
the response indicating whether the second device is subscribed to the second server;
obtain first parameters when the response indicates that the second device is subscribed to the second server;
communicate the first parameters to the second server;
receive, from the second server, a first parameters identifier associated with the first parameters;
store the first parameters identifier in the secure connection invitation or the message; and
send the secure connection invitation or the message to the second device,
the second device being capable of receiving the first parameters identifier stored by the secure connection invitation or the message to obtain the first parameters to aid in establishing the secure connection or to aid in decrypting the secure message.

13. The non-transitory computer-readable medium of claim 12, where the instructions further comprise:
one or more instructions, which, when executed by the one or more processors, cause the one or more processors to:
receive message sending options or connection options when the response indicates that the second device is not subscribed to the second server,
the connection options permitting the first device to establish an unsecured connection with the second device or to cancel the instruction to establish the secure connection with the second device, and
the message sending options permitting the first device to send an unsecured message to the second device or to cancel the instruction to send the secure message to the second device.

14. The non-transitory computer-readable medium of claim 12,
where the instruction to establish the secure connection with the second device or to send the secure message to the second device is an instruction to establish the secure connection with the second device, and
where the instructions further comprise:
one or more instructions, which, when executed by the one or more processors, cause the one or more processors to:
receive a second parameters identifier from the second device based on sending the secure connection invitation to the second device;
communicate the second parameters identifier to the second server;
receive, from the second server, second parameters based on communicating the second parameters identifier to the first server;
generate a security key based on the first parameters and the second parameters;
establish the secure connection with the second device based on the security key; and
communicate with the second device using the secure connection.

15. The non-transitory computer-readable medium of claim 12,
where the instruction to establish the secure connection with the second device or to send the secure message to the second device is an instruction to send the secure message to the second device,
where the instructions further comprise:
one or more instructions, which, when executed by the one or more processors, cause the one or more processors to:
generate a security key based on the first parameters; and
encrypt the message based on the key to form the secure message, and
where one or more instructions, of the plurality of instructions, to store the first parameters identifier in the message, comprise:
one or more instructions, which, when executed by the one or more processors, cause the one or more processors to:
store the first parameters identifier in the message based on forming the secure message.

16. The non-transitory computer-readable medium of claim 12,
where the instructions further comprise:
one or more instructions, which, when executed by the one or more processors, cause the one or more processors to:
initiate an authentication function with the first server;
receive authorization to communicate with the second server; and
receive the first parameters from the first server based on receiving the authorization to communicate with the first server, and
where one or more instructions, of the plurality of instructions, to obtain the first parameters comprise:
one or more instructions, which, when executed by the one or more processors, cause the one or more processors to:
obtain the first parameters based on receiving the first parameters from the second server.

17. A method comprising:
receiving, by a first server and from a first user device, information regarding a second user device;
generating, by the first server, a response,
the response indicating whether the second user device is subscribed to the first server;
sending, by the first server, the response to the first user device;
receiving, by the first server and from the first user device, first parameters when the response indicates that the second user device is subscribed to the first server;
storing, by the first server, the first parameters;
generating, by the first server, a first parameters identifier associated with the first parameters;
providing, by the first server, the first parameters identifier to the first user device;
receiving, by the first server, the first parameters identifier from the second user device; and
providing, by the first server, the first parameters to the second user device;
the second user device being capable of generating a security key based on the first parameters or based on second parameters, associated with the second user device, to decrypt a secure message or establish a secure connection with the first user device.

18. The method of claim 17, further comprising:

providing options to the first user device when the response indicates that the second user device is not subscribed to the first server,
   the options permitting the first user device to send an unsecured message to the second user device or to establish an unsecured connection with the second user device.

19. The method of claim 17, further comprising:

receiving the second parameters from the second user device;

generating a second parameters identifier associated with the second parameters;

providing the second parameters identifier to the second user device;

receiving the second parameters identifier from the first user device; and providing the second parameters to the first user device,
   the first user device being capable of generating a security key based on the first parameters and based on the second parameters, and
   the first user device and the second user device being capable of establishing the secure connection based on the security key generated by the first user device and the security key generated by the second user device.

20. The method of claim 17, further comprising:

receiving a request from the second user device to communicate with the first server; and authenticating the second user device to communicate with the first server based on a generic bootstrapping authentication process,
   where receiving the first parameters identifier from the second user device is based on authenticating the second user device.

21. The method of claim 17, further comprising:

receiving a request from the first user device to communicate with the first server; and authenticating the first user device to communicate with the first server based on a generic bootstrapping authentication process,
   where receiving information regarding the second user device is based on authenticating the first user device.

* * * * *